(12) United States Patent
Yoshinari et al.

(10) Patent No.: US 8,281,100 B2
(45) Date of Patent: Oct. 2, 2012

(54) SYSTEM AND METHOD FOR CONTROLLING TIMING OF COPY START

(75) Inventors: Noriyuki Yoshinari, Yokohama (JP); Yousuke Kasai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 564 days.

(21) Appl. No.: 12/510,728

(22) Filed: Jul. 28, 2009

(65) Prior Publication Data

US 2010/0318756 A1 Dec. 16, 2010

(30) Foreign Application Priority Data

Jun. 16, 2009 (JP) ................. 2009-143026

(51) Int. Cl.
*G06F 12/00* (2006.01)
(52) U.S. Cl. ............... 711/165; 711/162; 711/5
(58) Field of Classification Search ............. 711/162, 711/5, 165
See application file for complete search history.

(56) References Cited

U.S. PATENT DOCUMENTS

| | | | | |
|---|---|---|---|---|
| 2003/0140207 A1* | 7/2003 | Nagase et al. | ........ | 711/167 |
| 2005/0289308 A1* | 12/2005 | Kano | ........ | 711/161 |
| 2006/0242376 A1 | 10/2006 | Tsuge et al. | | |
| 2008/0052480 A1 | 2/2008 | Satoyama et al. | | |
| 2009/0138530 A1* | 5/2009 | Yao et al. | ........ | 707/204 |

FOREIGN PATENT DOCUMENTS

| | | |
|---|---|---|
| JP | 2000-347919 | 12/2000 |
| JP | 2005-301590 | 10/2005 |
| JP | 2006-302077 | 11/2006 |
| JP | 2009-080670 | 4/2009 |

\* cited by examiner

*Primary Examiner* — Jared Rutz
*Assistant Examiner* — Gurtej Bansal
(74) *Attorney, Agent, or Firm* — Foley & Lardner LLP

(57) ABSTRACT

A volume group is a group of two or more copy-source volumes and two or more copy-destination volumes. A computer system stores access rate information, which is information denoting an access rate for a copy-source volume at respective time periods. The computer system estimates the access rate for a future target period for each copy-source volume based on information denoting the access rate of each copy-source volume for one or more past target periods in a predetermined period from among the access rate information. The computer system determines the start timing of a copy for each copy-source volume based on the result of this estimation. A start time and an end time of the past target period are the same as the start time and the end time of a future target period.

14 Claims, 16 Drawing Sheets

FIG.3

ACCESS RATE TABLE 801

| MIGRATION GROUP ID | VOLUME ID | HOURLY ACCESS RATE ||||||| 11:00 FOLLOWING OMITTED |
| --- | --- | --- | --- | --- | --- | --- | --- | --- |
| | | 08:00 - 09:00 || 09:00 - 10:00 || 10:00 - 11:00 || |
| | | FREQ-UENCY (K TIMES) | TOTAL DATA TRANSFER AMOUNT (GB) | FREQ-UENCY (K TIMES) | TOTAL DATA TRANSFER AMOUNT (GB) | FREQ-UENCY (K TIMES) | TOTAL DATA TRANSFER AMOUNT (GB) | |
| A | 001 | 0 | 0 | 10 | 3000 | 20 | 6000 | |
| | 002 | 20 | 2000 | 10 | 2000 | 15 | 4500 | |
| | 003 | 0 | 0 | 0 | 0 | 15 | 3000 | |
| B | 011 | 1 | 100 | 20 | 6000 | 20 | 6000 | |
| | 012 | 2 | 200 | 15 | 4500 | 15 | 4500 | |
| | 013 | 5 | 500 | 10 | 3000 | 10 | 3000 | |
| | 014 | 10 | 1000 | 15 | 4500 | 15 | 4500 | |
| C | 101 | 0 | 0 | 0 | 0 | 0 | 0 | |
| | 051 | 0 | 0 | 0 | 0 | 0 | 0 | |
| | 063 | 0 | 0 | 0 | 0 | 0 | 0 | |
| | 071 | 0 | 0 | 0 | 0 | 0 | 0 | |
| | 089 | 0 | 0 | 0 | 0 | 0 | 0 | |

HOST TABLE                                                901

| HOST ID   | SERVICE TYPE |
|-----------|--------------|
| HOST 001  | INTRANET     |
| HOST 002  | INTRANET     |
| HOST 003  | INTRANET     |
| HOST 011  | B2B          |
| HOST 012  | B2B          |
| HOST 013  | B2B          |
| HOST 014  | B2B          |
| HOST 101  | B2C          |
| HOST 102  | B2C          |
| HOST 103  | B2C          |
| HOST 104  | B2C          |

FIG.5

GROUP MAPPING TABLE 1001

| HOST | MIGRATION GROUP |
|---|---|
| HOST 001 | A |
| HOST 002 | A |
| HOST 003 | A |
| HOST 011 | B |
| HOST 012 | B |
| HOST 013 | B |
| HOST 014 | B |
| HOST 101 | C |
| HOST102 | C |
| HOST103 | C |
| HOST 104 | C |

FIG.6A

MIGRATION GROUP TABLE 601

| MIGRATION GROUP | VOLUME ID (MIGRATION SOURCE) | VOLUME ID (MIGRATION DESTINATION) |
|---|---|---|
| A | VOLUME 001 | VOLUME 1001 |
|   | VOLUME 002 | VOLUME 1002 |
|   | VOLUME 003 | VOLUME 1003 |
| B | VOLUME 011 | VOLUME 1011 |
|   | VOLUME 012 | VOLUME 1012 |
|   | VOLUME 013 | VOLUME 1013 |
|   | VOLUME 014 | VOLUME 1014 |
| C | VOLUME 101 | VOLUME 1101 |
|   | VOLUME 051 | VOLUME 1051 |
|   | VOLUME 063 | VOLUME 1063 |
|   | VOLUME 071 | VOLUME 1071 |
|   | VOLUME 089 | VOLUME 1089 |

FIG.6B

MIGRATION SCHEDULE TABLE 701

| MIGRATION GROUP | START TIME |
|---|---|
| A | 08:00 |
| B | 17:00 |
| C | 21:00 |

FIG.7

POINT TABLE (DAILY) — 1101D

| SERVICE TYPE / DEVIATION TIME (h) | 0 | 1 | 2 | 3 | 4 | 5 | 6 | 7 | 8 | 9 | 10 | 11 | 12 |
|---|---|---|---|---|---|---|---|---|---|---|---|---|---|
| B2C | 40% | 30% | 15% | 10% | 3% | 1% | 1% | 0% | 0% | 0% | 0% | 0% | 0% |
| INTRANET | 95% | 5% | 0% | 0% | 0% | 0% | 0% | 0% | 0% | 0% | 0% | 0% | 0% |
| B2B | 80% | 10% | 5% | 5% | 0% | 0% | 0% | 0% | 0% | 0% | 0% | 0% | 0% |

FIG.8

POINT TABLE (WEEKLY)                                                                                       1101W

| SERVICE TYPE | | DC | \multicolumn{13}{c|}{DEVIATION TIME (h)} |
|---|---|---|---|---|---|---|---|---|---|---|---|---|---|---|
| | | | 0 | 1 | 2 | 3 | 4 | 5 | 6 | 7 | 8 | 9 | 10 | 11 | 12 |
| B2C | ONE DAY AGO | x0.80 | 40% | 30% | 15% | 10% | 3% | 1% | 1% | 0% | 0% | 0% | 0% | 0% | 0% |
| | TWO DAYS AGO | x0.10 | 40% | 30% | 15% | 10% | 3% | 1% | 1% | 0% | 0% | 0% | 0% | 0% | 0% |
| | THREE DAYS AGO | x0.05 | 40% | 30% | 15% | 10% | 3% | 1% | 1% | 0% | 0% | 0% | 0% | 0% | 0% |
| | FOUR DAYS AGO | x0.03 | 40% | 30% | 15% | 10% | 3% | 1% | 1% | 0% | 0% | 0% | 0% | 0% | 0% |
| | FIVE DAYS AGO | x0.01 | 40% | 30% | 15% | 10% | 3% | 1% | 1% | 0% | 0% | 0% | 0% | 0% | 0% |
| | SIX DAYS AGO | x0.01 | 40% | 30% | 15% | 10% | 3% | 1% | 1% | 0% | 0% | 0% | 0% | 0% | 0% |
| | SEVEN DAYS AGO | x0.00 | 40% | 30% | 15% | 10% | 3% | 1% | 1% | 0% | 0% | 0% | 0% | 0% | 0% |
| INTRANET | ONE DAY AGO | x0.14 | 95% | 5% | 0% | 0% | 0% | 0% | 0% | 0% | 0% | 0% | 0% | 0% | 0% |
| | TWO DAYS AGO | x0.14 | 95% | 5% | 0% | 0% | 0% | 0% | 0% | 0% | 0% | 0% | 0% | 0% | 0% |
| | THREE DAYS AGO | x0.14 | 95% | 5% | 0% | 0% | 0% | 0% | 0% | 0% | 0% | 0% | 0% | 0% | 0% |
| | FOUR DAYS AGO | x0.14 | 95% | 5% | 0% | 0% | 0% | 0% | 0% | 0% | 0% | 0% | 0% | 0% | 0% |
| | FIVE DAYS AGO | x0.14 | 95% | 5% | 0% | 0% | 0% | 0% | 0% | 0% | 0% | 0% | 0% | 0% | 0% |
| | SIX DAYS AGO | x0.14 | 95% | 5% | 0% | 0% | 0% | 0% | 0% | 0% | 0% | 0% | 0% | 0% | 0% |
| | SEVEN DAYS AGO | x0.14 | 95% | 5% | 0% | 0% | 0% | 0% | 0% | 0% | 0% | 0% | 0% | 0% | 0% |
| B2B | ONE DAY AGO | x0.14 | 80% | 10% | 5% | 5% | 0% | 0% | 0% | 0% | 0% | 0% | 0% | 0% | 0% |
| | TWO DAYS AGO | x0.14 | 80% | 10% | 5% | 5% | 0% | 0% | 0% | 0% | 0% | 0% | 0% | 0% | 0% |
| | THREE DAYS AGO | x0.14 | 80% | 10% | 5% | 5% | 0% | 0% | 0% | 0% | 0% | 0% | 0% | 0% | 0% |
| | FOUR DAYS AGO | x0.14 | 80% | 10% | 5% | 5% | 0% | 0% | 0% | 0% | 0% | 0% | 0% | 0% | 0% |
| | FIVE DAYS AGO | x0.14 | 80% | 10% | 5% | 5% | 0% | 0% | 0% | 0% | 0% | 0% | 0% | 0% | 0% |
| | SIX DAYS AGO | x0.14 | 80% | 10% | 5% | 5% | 0% | 0% | 0% | 0% | 0% | 0% | 0% | 0% | 0% |
| | SEVEN DAYS AGO | x0.14 | 80% | 10% | 5% | 5% | 0% | 0% | 0% | 0% | 0% | 0% | 0% | 0% | 0% |

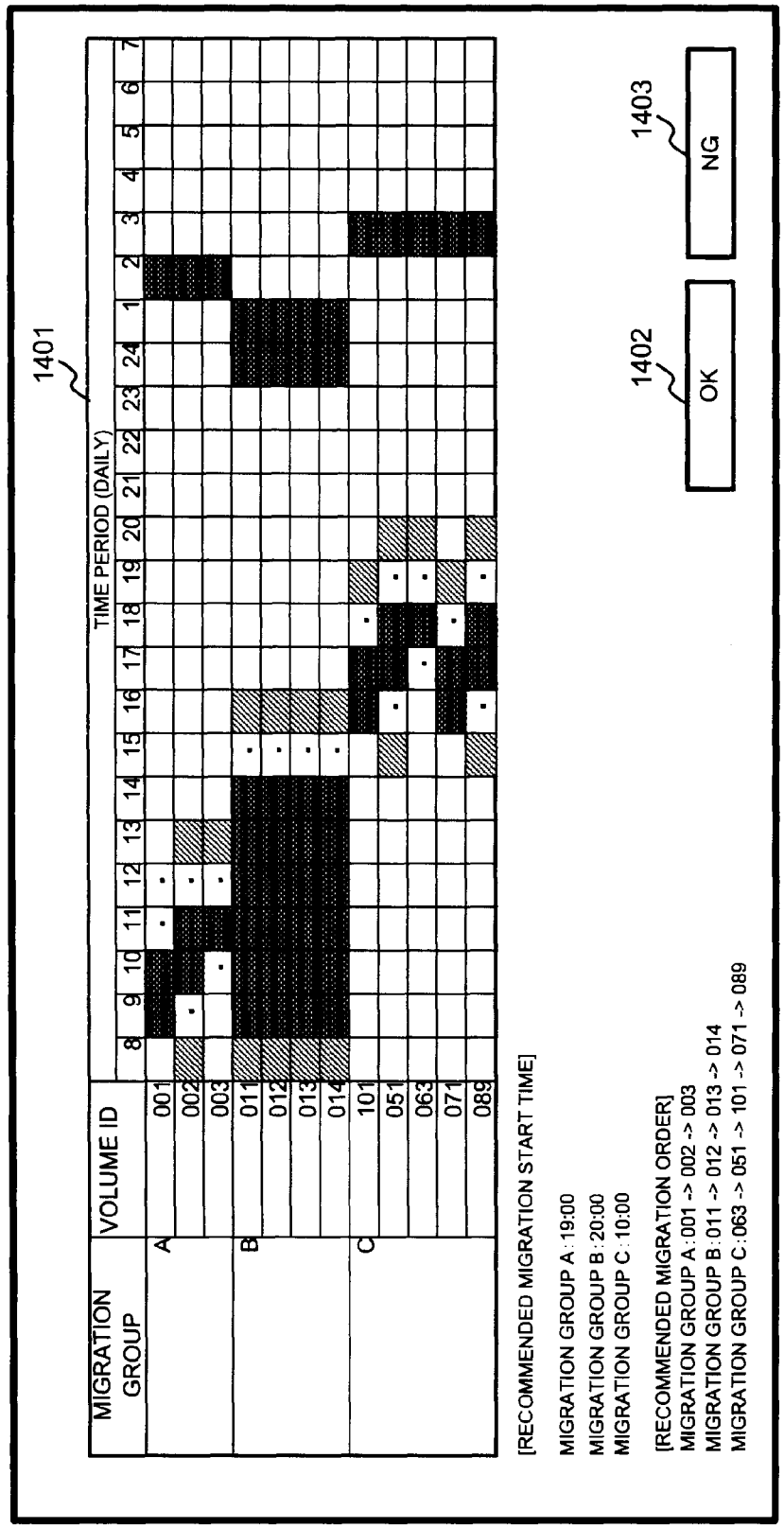

FIG.10

ESTIMATED HOURLY DATA TRANSFER AMOUNT — 1801 ...A

| VOLUME ID | 8 | 9 | 10 | 11 | 12 | 13 | 14 | 15 | 16 | 17 | 18 | 19 |
|---|---|---|---|---|---|---|---|---|---|---|---|---|
| 1 | 6.83 | 10.83 | 12.50 | 11.46 | 8.96 | 5.38 | 2.58 | 1.33 | 0.46 | 0.17 | 0.08 | 0.00 |
| 2 | 7.71 | 11.17 | 13.54 | 13.54 | 11.17 | 7.58 | 4.25 | 2.04 | 0.92 | 0.33 | 0.13 | 0.04 |
| 3 | 2.92 | 5.33 | 8.75 | 10.63 | 9.58 | 6.88 | 4.00 | 1.92 | 0.88 | 0.33 | 0.13 | 0.04 |
| 11 | 9.17 | 13.71 | 16.75 | 18.21 | 18.58 | 17.71 | 15.54 | 12.08 | 7.92 | 4.38 | 2.21 | 1.17 |
| 12 | 9.17 | 13.71 | 16.75 | 18.21 | 18.58 | 17.71 | 15.54 | 12.08 | 7.92 | 4.38 | 2.21 | 1.17 |
| 13 | 9.17 | 13.71 | 16.75 | 18.21 | 18.58 | 17.71 | 15.54 | 12.08 | 7.92 | 4.38 | 2.21 | 1.17 |
| 14 | 9.17 | 13.71 | 16.75 | 18.21 | 18.58 | 17.71 | 15.54 | 12.08 | 7.92 | 4.38 | 2.21 | 1.17 |
| 101 | 0.13 | 0.13 | 0.13 | 0.25 | 0.58 | 1.75 | 3.42 | 6.58 | 10.42 | 11.88 | 10.21 | 7.29 |
| 51 | 0.13 | 0.13 | 0.09 | 0.22 | 0.54 | 1.48 | 3.13 | 6.08 | 10.04 | 12.98 | 13.17 | 11.05 |
| 63 | 0.13 | 0.13 | 0.00 | 0.08 | 0.21 | 0.46 | 1.33 | 2.79 | 5.33 | 8.75 | 10.63 | 9.58 |
| 71 | 0.13 | 0.13 | 0.13 | 0.25 | 0.58 | 1.75 | 3.42 | 6.58 | 10.42 | 11.88 | 10.21 | 7.29 |
| 89 | 0.13 | 0.17 | 0.13 | 0.33 | 0.92 | 2.04 | 4.21 | 7.54 | 11.04 | 13.13 | 12.92 | 9.92 |

FIG.11

ESTIMATED HOURLY DATA TRANSFER AMOUNT 1801

| VOLUME ID | 20 | 21 | 22 | 23 | 24 | 1 | 2 | 3 | 4 | 5 | 6 | 7 |
|---|---|---|---|---|---|---|---|---|---|---|---|---|
| 1 | 0.13 | 0.13 | 0.38 | 1.25 | 1.88 | 3.75 | 5.00 | 3.88 | 2.13 | 1.83 | 2.17 | 3.58 |
| 2 | 0.13 | 0.13 | 0.38 | 1.25 | 1.88 | 3.75 | 5.04 | 3.88 | 2.21 | 2.17 | 2.42 | 4.38 |
| 3 | 0.13 | 0.13 | 0.38 | 1.25 | 1.88 | 3.75 | 5.00 | 3.75 | 1.96 | 1.46 | 0.83 | 1.46 |
| 11 | 0.83 | 1.75 | 3.17 | 5.63 | 8.75 | 8.75 | 5.67 | 3.29 | 2.00 | 1.54 | 2.75 | 5.13 |
| 12 | 0.83 | 1.75 | 3.17 | 5.63 | 8.75 | 8.75 | 5.67 | 3.29 | 2.00 | 1.54 | 2.75 | 5.13 |
| 13 | 0.83 | 1.75 | 3.17 | 5.63 | 8.75 | 8.75 | 5.67 | 3.29 | 2.00 | 1.54 | 2.75 | 5.13 |
| 14 | 0.83 | 1.75 | 3.17 | 5.63 | 8.75 | 8.75 | 5.67 | 3.29 | 2.00 | 1.54 | 2.75 | 5.13 |
| 101 | 4.13 | 2.08 | 1.04 | 0.71 | 1.38 | 1.92 | 3.75 | 5.00 | 3.75 | 1.88 | 1.25 | 0.38 |
| 51 | 7.55 | 4.34 | 2.17 | 1.29 | 1.58 | 2.00 | 3.79 | 5.00 | 3.75 | 1.88 | 1.25 | 0.38 |
| 63 | 6.88 | 4.13 | 2.04 | 1.25 | 1.58 | 2.00 | 3.79 | 5.00 | 3.75 | 1.88 | 1.25 | 0.38 |
| 71 | 4.13 | 2.08 | 1.04 | 0.71 | 1.38 | 1.92 | 3.75 | 5.00 | 3.75 | 1.88 | 1.25 | 0.38 |
| 89 | 5.92 | 3.13 | 1.54 | 0.88 | 1.46 | 1.96 | 3.75 | 5.00 | 3.75 | 1.88 | 1.25 | 0.38 |

| VOLUME ID | ESTIMATED DATA TRANSFER AMOUNT (GB) |
| --- | --- |
| 001 | 6.83 |
| 002 | 7.71 |
| 003 | 2.92 |

| MIGRATION GROUP | ESTIMATED HOURLY DATA TRANSFER AMOUNT PER MIGRATION GROUP | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- |
| | 8 | 9 | 10 | 11 | 12 | 13 | 14 | 15 | 16 | 17 | 18 | 19 | 20 | 21 | 22 | 23 | 24 | 1 | 2 | 3 | 4 | 5 | 6 | 7 |
| A | 5.82 | 9.11 | 11.60 | 11.88 | 9.90 | 6.61 | 3.61 | 1.76 | 0.75 | 0.28 | 0.11 | 0.03 | 0.13 | 0.13 | 0.38 | 1.25 | 1.88 | 3.75 | 5.01 | 3.83 | 2.10 | 1.82 | 1.81 | 3.14 |
| B | 9.17 | 13.71 | 16.75 | 18.21 | 18.58 | 17.71 | 15.54 | 12.08 | 7.92 | 4.38 | 2.21 | 1.17 | 0.83 | 1.75 | 3.17 | 5.63 | 8.75 | 8.75 | 5.67 | 3.29 | 2.00 | 1.54 | 2.75 | 5.13 |
| C | 0.13 | 0.13 | 0.09 | 0.23 | 0.57 | 1.50 | 3.10 | 5.92 | 9.45 | 11.72 | 11.43 | 9.03 | 5.72 | 3.15 | 1.57 | 0.97 | 1.48 | 1.96 | 3.77 | 5.00 | 3.75 | 1.88 | 1.25 | 0.38 |

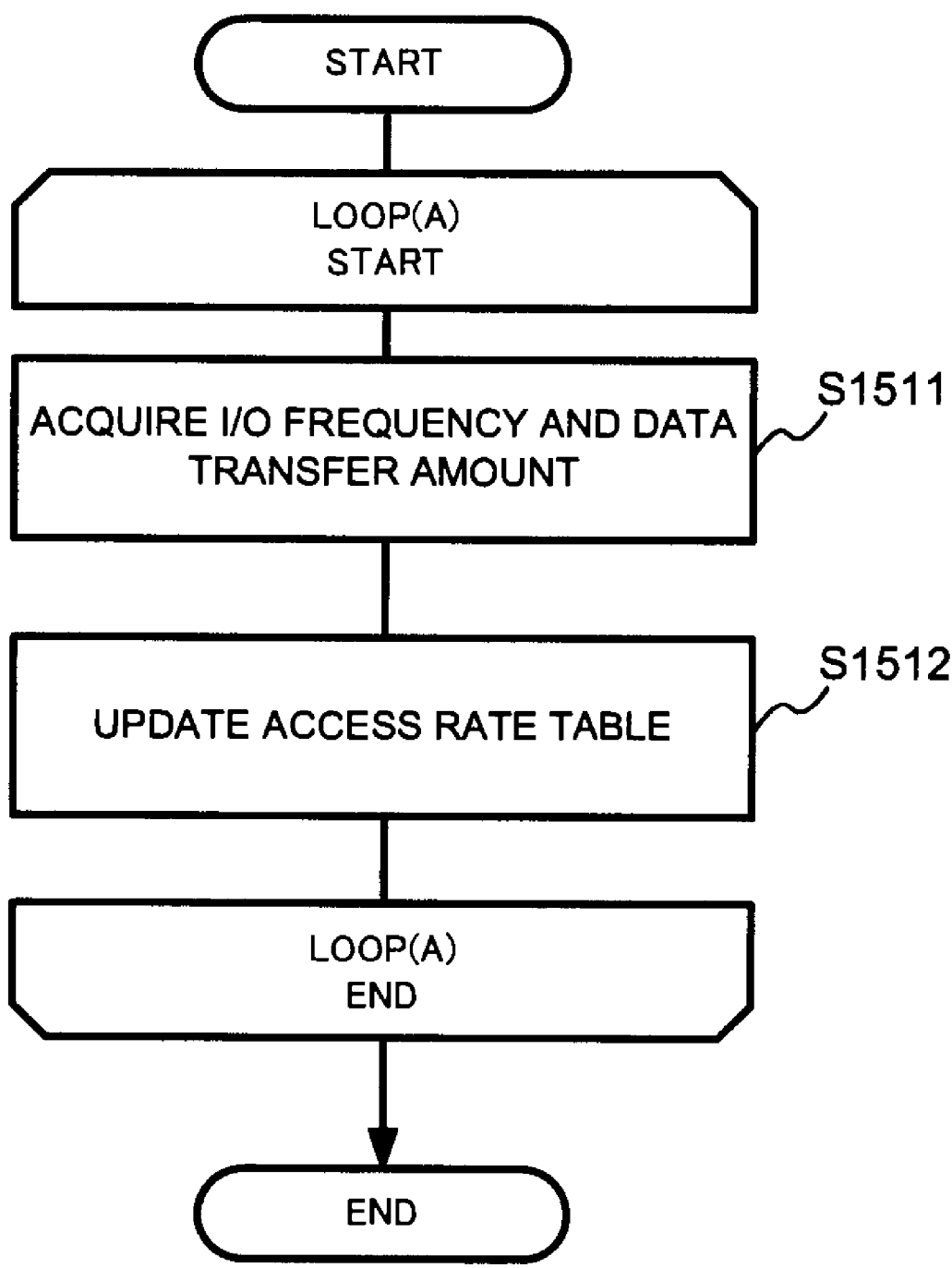

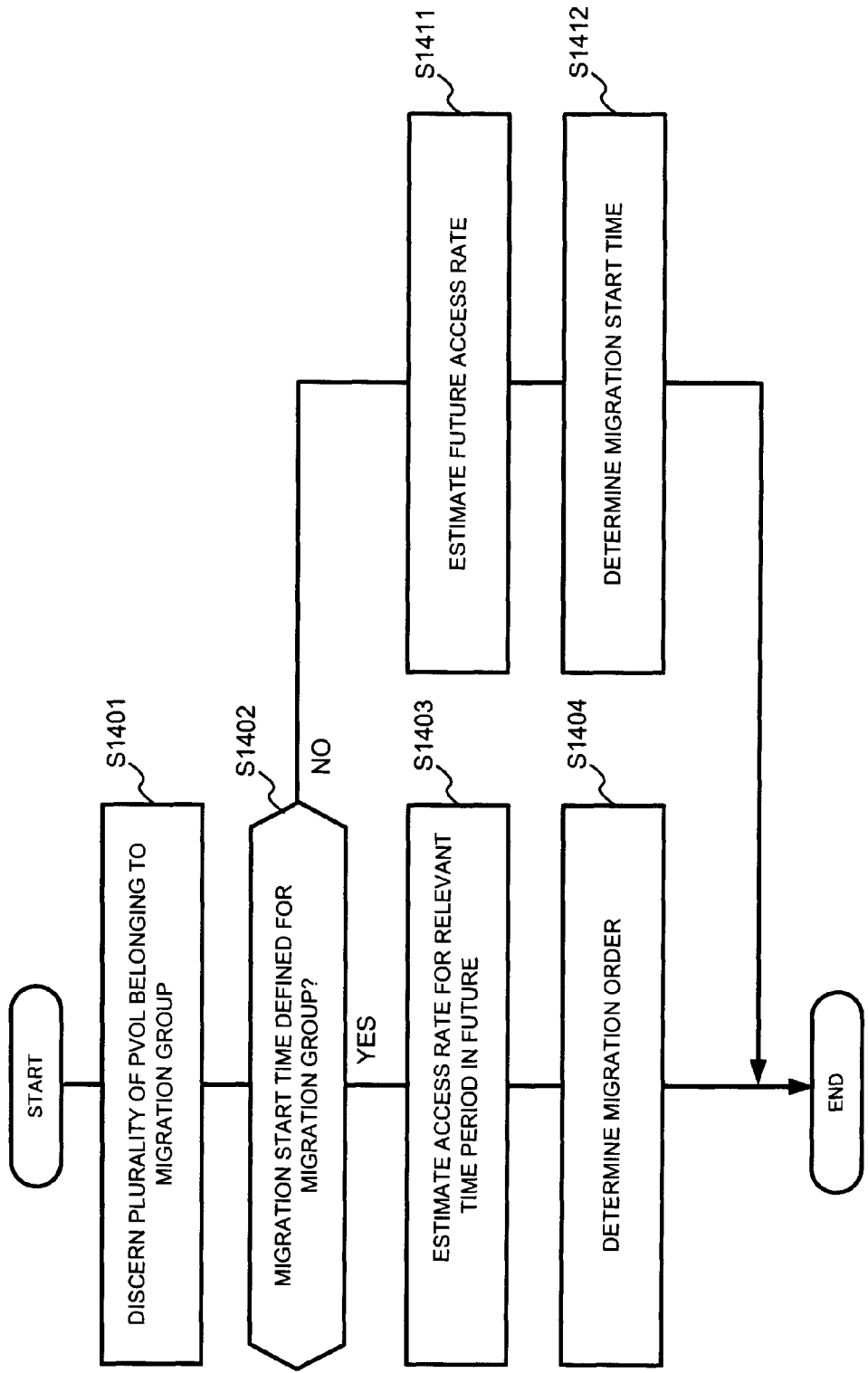

SYSTEM AND METHOD FOR CONTROLLING TIMING OF COPY START

This application claims priority from Japanese Patent Application 2009-143026 filed on Jun. 16, 2009. The entire content of the aforementioned application is incorporated herein by reference.

BACKGROUND

The present invention generally relates to controlling a data copy from a logical volume to another logical volume.

Technology related to a volume copy, which is a data copy from a logical volume (simply referred to as "volume" below) to another logical volume is known. A volume copy may be a volume replication or a volume migration. Generally speaking, in the case of a volume replication, the data stored in the copy-source volume must not be deleted even after the copy has been completed. By contrast, in the case of a volume migration, the data stored in the copy source volume generally may be deleted upon completion of the copy. Technology related to volume replication, for example, is disclosed in Japanese Patent Application Laid-open No. 2005-301590, and technology related to volume migration, for example, is disclosed in Japanese Patent Application Laid-open No. 2006-302077.

SUMMARY

In the following explanation, the copy-source volume may be called the primary volume, the abbreviation for which is "PVOL", and the copy-destination volume may be called the secondary volume, the abbreviation for which is "SVOL".

However, in accordance with the volume migration technology, in general in a case where data is written anew to the PVOL during the volume migration, this data needs to be migrated to the SVOL even though the write-destination area of this data is a migration-completed area. This is considered particularly problematic for technology that enables a batch volume migration between volumes belonging to a volume group. This is because the volume migration is carried out between different volumes even though the volume migration between either volume has been completed, thereby lengthening the time required for volume migrations for the entire volume group.

This kind of problem is not limited to the volume migration, but rather is also possible for the volume replication.

Accordingly, an object of the present invention is to prevent prolonging the time required for a volume copy for the entire volume group.

A computer system is coupled to one or more storage devices belonging to a volume group. The computer system comprises either one or a plurality of computers. The volume group is a group of two or more copy-source volumes and two or more copy-destination volumes.

The computer system has a storage resource and a processor that is coupled to the storage resource. The storage resource stores access rate information, which is information denoting the access rate for each copy-source volume at respective time periods. The processor estimates the access rate of each copy-source volume for a future target period based on information in the access rate information denoting the access rate of each copy-source volume at one or more past target periods in a predetermined period. The processor determines the timing of a copy start for each copy-source volume based on the results of these estimates. The start time and end time of a past target period are the same as the start time and end time of a future target period.

For example, the predetermined period may be a period from the present time until a predetermined time in the past. A predetermined time in the past may be one day ago, one week ago or one month ago. In a case where the predetermined period is one day and the target period is one certain time period (for example, 09:00 to 10:00) during that one day, there is one past target period, but in a case where the predetermined period is n days (where n is an integer of 2 or more), there is n number of past target periods.

These processes are able to be carried out by the processor executing a computer program. This computer program may be installed from a remote server, or may be installed from a storage medium (for example, a CD-ROM, DVD (Digital Versatile Disk) or other such flexible storage medium). A portion of these processes may also be realized using hardware.

The access rate for a single copy-source volume is the access rate to this copy-source volume from the host computer. Access rate may be defined from either one or a plurality of standpoints (for example, access frequency and/or data transfer amount).

BRIEF DESCRIPTION OF THE DRAWINGS

FIG. 3 shows an access rate table 801;

FIG. 5 shows group mapping table 1001;

FIG. 6A shows a migration group table 601;

FIG. 6B shows a migration schedule table 701;

FIG. 7 shows a first point table 1101D;

FIG. 8 shows a second point table 1101W;

FIG. 9 shows an example of a GUI (Graphical User Interface) displayed by a migration schedule management module 304;

FIG. 10 shows a portion of an estimated access rate table 1801;

FIG. 11 shows the remainder of this estimated access rate table 1801;

FIG. 12A shows the estimated data transfer amounts of the respective PVOL 1, 2 and 3 belonging to a migration group A in a case where the migration start time of the migration group A is 8:00;

FIG. 12B shows a table 1801G for estimating the access rate for each migration group;

FIG. 13 shows the flow of processing for an access check carried out by an access check module 302;

FIG. 14 shows the flow of processing for a first timing determination;

DETAILED DESCRIPTION OF THE EMBODIMENTS

Figure 1A:
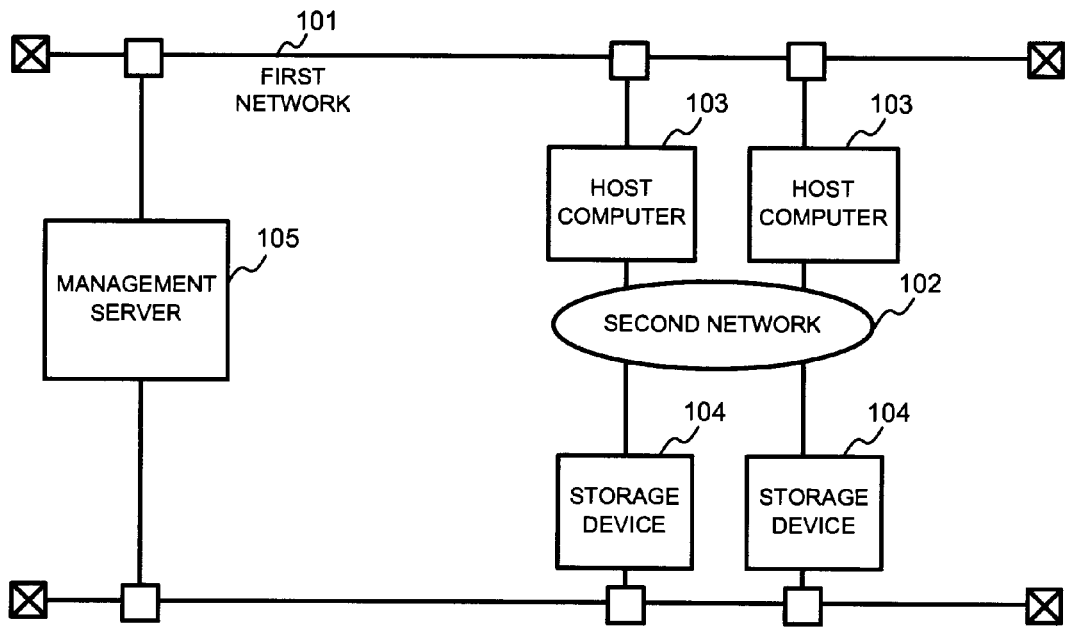
FIG. 1A shows a data processing system related to one embodiment of the present invention.

One embodiment of the present invention will be explained below by referring to the drawings. In the subsequent explanation, information is expressed by using an expression like "xxx table", but information may also be expressed using a data structure other than a table. In the following embodiment, a volume migration is performed as a volume copy. Also, in the following explanation, the processing carried out by a computer program is actually performed by the processor (CPU) that executes this computer program. Further, in the following explanation, a logical volume will be referred to simply as a "volume".

FIG. 1A shows a data processing system related to one embodiment of the present invention.

A plurality of (or one) host computer 103, a plurality of (or one) storage device 104, and a management server 105 are coupled to a first network 101. The first network 101 is a communication network (for example a LAN (Local Area Network)), and communications are carried out over this network using a predetermined protocol, for example, the IP (Internet Protocol).

A plurality of (or one) host computer 103 and a plurality of (or one) storage device 104 are coupled to a second network 102. The second network 102 is also a communication network (for example, a SAN (Storage Area Network)), and communications are carried out over this network using a predetermined protocol, for example, FC (Fibre Channel) or iSCSI. The second network 102 may also be integrated with the first network 101.

The host computer 103 issues an access command (a write command or a read command) specifying a volume of the storage device 104. Consequently, the host computer 103 accesses the desired volume.

The storage device 104 has a plurality of volumes. The plurality of volumes comprise a migration-source volume and/or a migration-destination volume. The migration-source volume is accessed from the host computer 103. The migration-source volume and the migration-destination volume belong to a migration group. The migration group is an example of a volume group. The migration group is a group of two or more migration-source volumes (PVOL below) and two or more migration-destination volumes (SVOL below). Of the PVOL and SVOL, at least the PVOL are capable of being accessed by any host computer 103.

The management server 105 is an example of a computer system. The management server 105 manages information related to the respective host computers 103 and the respective storage devices 104. The management server 105 controls the timing of the start of a migration from a PVOL belonging to the migration group. There may also be cases in which there is a plurality of migration groups. In a case like this, a migration start time is determined for each migration group.

The host computer 103, the storage device 104 and the management server 105 will be explained in detail below.

Although not shown in the drawing, the host computer 103 has a CPU (Central Processing Unit), a storage resource (for example, a memory), a first IF (interface device) for carrying out communications via the first network 101, and a second IF (interface device) for carrying out communications via the second network 102. The storage resource stores computer programs. The computer programs, for example, include an access program for issuing an access command to a volume, and an application program for executing a predetermined kind of service. The CPU executes the access program and the application program.

The access program sends an access command comprising information denoting an access destination. This information, for example, comprises a volume ID (for example, a LUN (Logical Unit Number)) and a storage area address (for example, LBA (Logical Block Address)). Access is carried out to the storage area denoted in this information.

The application program provides a service to the end user (for example, the user of a not-shown user terminal that communicates with the host computer 103) of the host computer 103. The kind of service (application), for example, may be at least one of an intranet-based service, a B2B (Business to Business)-oriented service, and a B2C (Business to Consumer)-oriented service (for example, TV shopping, ticket sales or online marketing). The service-start and service-end times (the scheduled service time) is determined beforehand. The application program manages the scheduled service time. However, in actuality, the application (service) may not start and/or end as scheduled for one reason or another. In a case like this, the service will not proceed smoothly in accordance with an automatic start and/or an automatic stop by the application program. For this reason, the service is started and/or stopped manually by the user of the host computer 103. The application program sends the management server 105 a log denoting that this automatic start and/or stop was switched to a manual start and/or stop. This log, for example, comprises the scheduled service time and a service execution time. Based on this log, the management server 105 creates a point table, which will be explained further below.

Figure 1B:
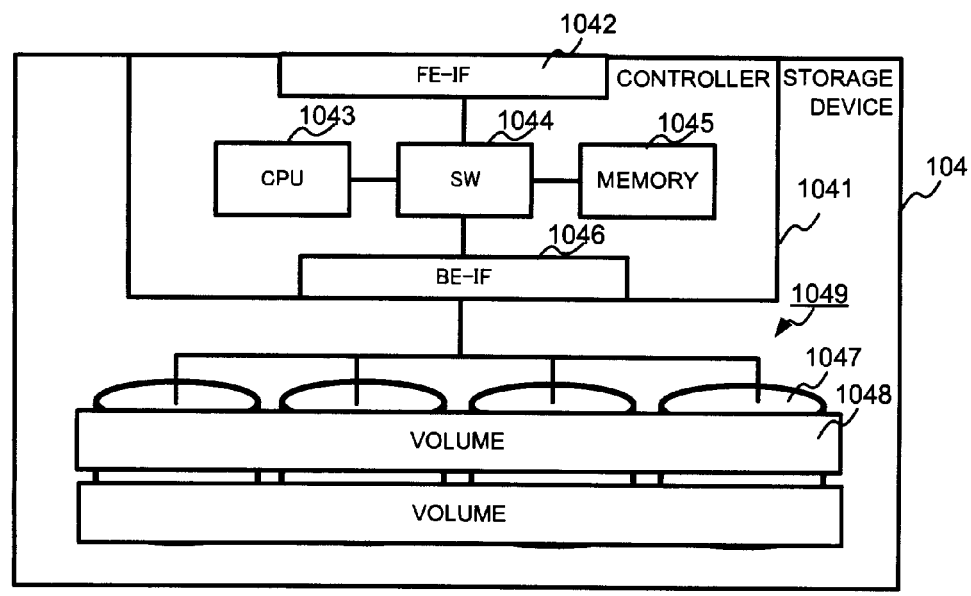
FIG. 1B shows the configuration of a storage device 104.

FIG. 1B shows the configuration of the storage device 104.

The storage device 104 has a controller 1041, and a magnetic disk group 1049.

The magnetic disk group 1049 has a plurality of magnetic disks (for example, hard disk drives) 1047. The magnetic disk group 1049 may be a plurality of RAID (Redundant Array of Independent (or Inexpensive) Disks) groups. Each RAID group has two or more magnetic disks 1047. Either one or a plurality of volumes 1048 are formed on the basis of a single RAID group. The storage device 104 has a plurality of volumes 1048. Furthermore, the volume 1048 referred to in this embodiment is a substantial volume that is formed on the basis of a RAID group, but the volume 1048 is not limited to this, and may also be a virtual volume (for example, an expanded capacity volume in accordance with Thin Provisioning technology, or a virtual volume associated to an external volume based on an external storage). Also, a different kind of nonvolatile storage medium, for example, a flash memory may be used instead of the magnetic disk 1047.

The controller 1041 controls access to the volume 1048 from the host computer 103. The controller 1041, for example, has a front-end interface device (FE-IF) 1042 for receiving a command, like an access command; a CPU 1043 for processing the command; a memory 1045 that includes a cache memory for temporarily storing the data exchanged between the volume 1048 and the host computer 103; a back-end interface device (BE-IF) 1046 for the magnetic disk 1047; and a switch (SW) 1044 for controlling communications among these elements 1042, 1043, 1045 and 1046.

The controller 1041 starts a migration by receiving a migration command comprising a PVOL ID and a SVOL ID from the management server 105.

Furthermore, this migration may be carried out between a plurality of storage devices 104. In a case like this, either the storage device 104 including the PVOL or the storage device 104 including the SVOL will receive the migration command. Furthermore, the migration command, for example, may also comprise the migration start time. In accordance with this, the controller 1041 starts the migration in accordance with the migration command when the present time constitutes this migration start time.

In addition, instead of specifying the SVOL, the migration command may specify other information, such as a RAID group ID.

In a case where the controller 1041 receives a migration command, the data inside the PVOL is read out from the magnetic disk 1047 that serves as the basis of this PVOL, and written to the magnetic disk 1047 corresponding to a migration destination specified from this migration command (volume migration). A case where this specification uses the SVOL ID to specify the migration destination, the magnetic disk 1047 corresponding to the SVOL is specified.

The following methods (A) through (C), for example, are for writing data to the PVOL from the host computer 103 during a volume migration, but data processing may be performed using methods other than these methods.

(A) In a case where the write destination of the data to be newly written is a migration-completed area (a storage area in which the data of a migration that has ended is being stored), the controller 1041 writes this data to both the magnetic disk 1047 that serves as the basis for the PVOL and to the magnetic disk 1047 that serves as the basis for the SVOL prior to returning a write-command-complete response to the host computer 103.

(B) In a case where the write destination of the data to be newly written is a migration-completed area, the controller 1041 writes this data to the magnetic disk 1047 that serves as the basis for the PVOL prior to returning a write-command-complete response to the host computer 103. Thereafter, the controller 1041 migrates the newly written data from the magnetic disk that serves as the basis for the PVOL to the magnetic disk 1047 that serves as the basis for the SVOL as a repeatedly executed difference migration.

(C) The controller 1041 writes the newly written data to the magnetic disk 1047 that serves as the basis for the SVOL prior to returning a write-command-complete response to the host computer 103.

Furthermore, since the storage device 104 has a cache memory, those portions of the explanation up to this point (and in the explanation from this point forward) that have referred to a read-out from the magnetic disk 1047 may also be expressed as a read-out from the cache memory. Similarly, those portions of the explanation that have referred to a write to the magnetic disk 1047 may also be expressed as a write to the cache memory. Data written to the cache memory is ultimately written to the magnetic disk.

In a case where a failure has occurred in the magnetic disk 1047, the controller 1041 may send the management server 105 fault information denoting the magnetic disk 1047 in which the failure occurred. This fault information may be sent in response to a repeatedly received reference request from the management server 105, and may also be proactively sent regardless of whether or not this reference request has been received. The fault information, for example, comprises at least one of the ID of the magnetic disk 1047 in which the failure occurred, the ID of the RAID group comprising this magnetic disk 1047, or the ID of the volume 1048 based on this magnetic disk 1047.

In a case where a failure has occurred in the magnetic disk 1047 that serves as the basis for either the PVOL or the SVOL, the controller 1041 may cancel this volume migration. In a case like this, the controller 1041 may notify the management server 105 that this volume migration has been cancelled. At the time of this notification, the controller 1041 may also notify the management server 105 of information showing that a failure has occurred in the magnetic disk 1047.

As volume migration schemes, there may be a first migration scheme that omits an SVOL data save (that is, a scheme that writes over the data in the SVOL), and a second migration scheme that performs the migration while saving the data inside the SVOL by replacing the data inside the PVOL with the data inside the SVOL. In the second migration scheme, for example, a data migration is carried out from the SVOL to a temporary-save volume, a data migration is carried out from the PVOL to the SVOL, and a data migration is carried out from the temporary-save volume to the PVOL (the second scheme may also be realized using another method).

In the case of the above-described first migration scheme, the migration may be disabled in order to avoid writing over previously migrated data when an administrator, who differs from the administrator that created the migration task, carries out a migration to the SVOL first. There are cases in which this disabling process is performed by the storage side, and there are cases in which this process is performed by the management server side. A disable like that described above may be realized by making it possible to set, for each volume, information as to whether or not a volume may be specified as the migration destination with respect to the SVOL. In a case where specifiable information like this exists, performing a migration beforehand causes the data inside a volume that may not be specified as the migration destination to be migrated to the SVOL. The migration carried out by the migration task creator will be disabled as a result.

In the explanation of this embodiment, the expression "volume migration" may be used to prevent redundancy in the explanation. In a volume migration, the data inside the PVOL is actually read out from the magnetic disk that serves as the basis of the PVOL, and written to the magnetic disk that serves as the basis for the SVOL.

Figure 2A:
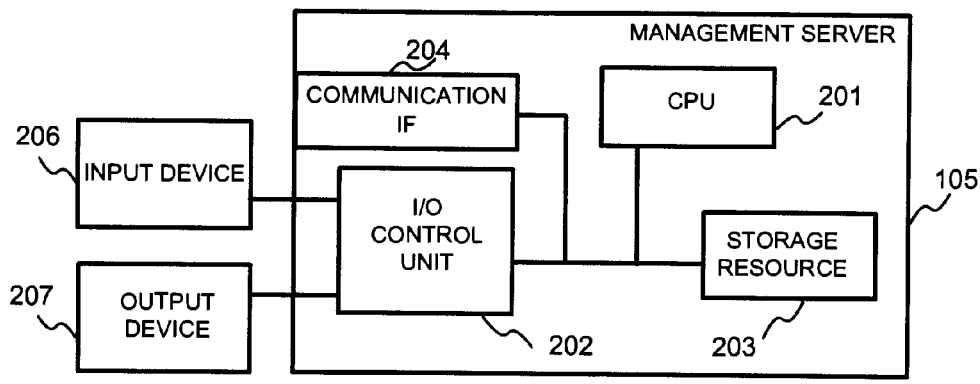
FIG. 2A shows the hardware configuration of a management server 105.

FIG. 2A shows the hardware configuration of the management server 105.

The management server 105 has a CPU 201; a storage resource (for example, a memory) 203; a communication IF 204; an input device 206; an output device 207; and an I/O (Input/Output) control unit 202. The communication IF 204 is an interface device for communicating over the first network 101. The input device 206, for example, is a keyboard and/or a pointing device. The output device 207, for example, is a display device. The input device 206 and the output device 207 may be integrated together like a touch panel display device. The I/O control unit 202 controls the input of information inputted from the input device 206, and the output of information to the output device 207.

The storage resource 203 stores computer programs to be executed by the CPU 201, and information that is either referenced or created by the CPU 201. The computer programs and information, for example, may include the below.

Figure 2B:
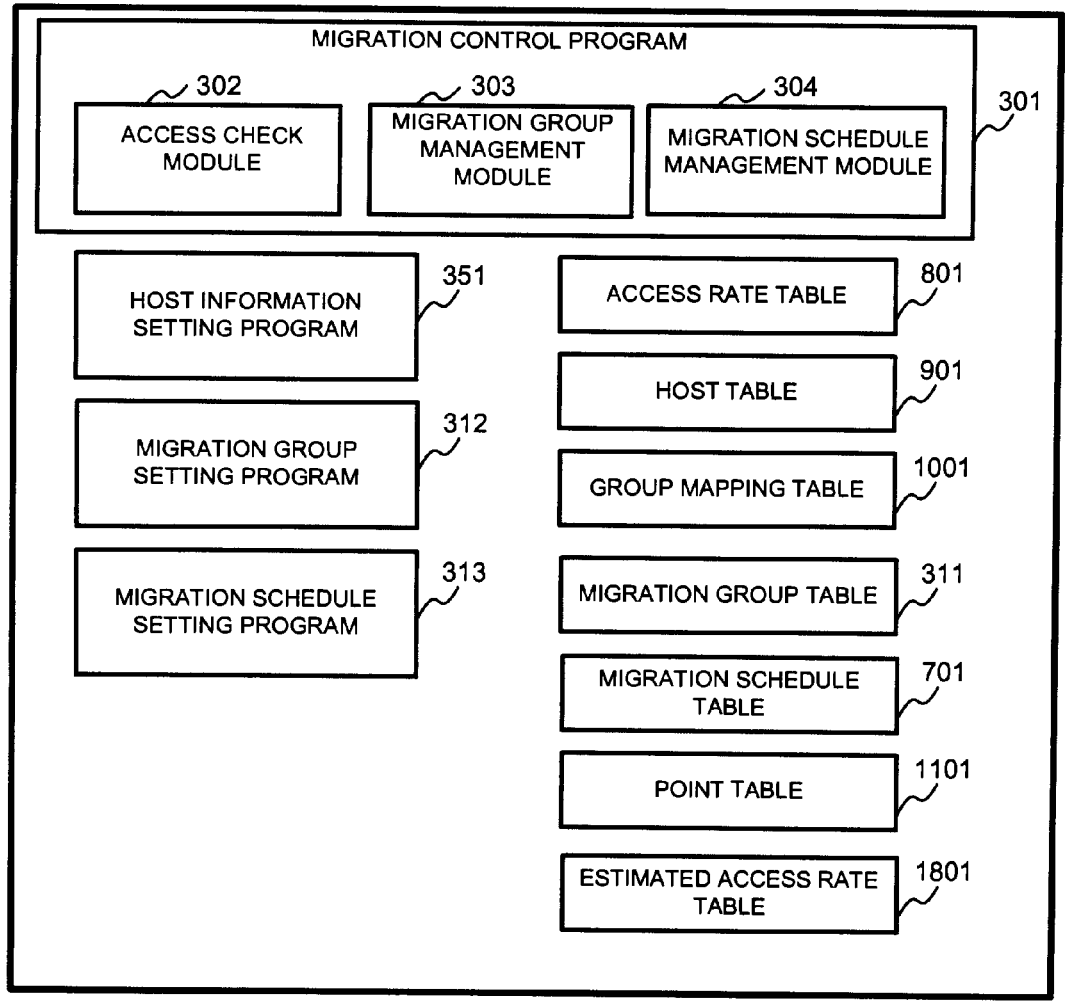
FIG. 2B shows the computer programs and information stored and maintained by a storage resource 203.

FIG. 2B shows the computer programs and information stored and maintained by the storage resource 203.

The computer programs to be executed by the CPU 201, for example, may include a migration control program 301; a host information setting program 351; a migration group setting program 312; and a migration schedule setting program 313. The information that is either referenced or created by the CPU 201, for example, may include an access rate table 801; a host table 901; a group mapping table 1001; a migration group table 311; a migration schedule table 701; a point table 1101; and an estimated access rate table 1801.

The migration control program 301 performs control related to a volume migration. The migration control program 301, for example, has an access check module 302; a migration group management module 303; and a migration schedule management module 304.

The access check module 302 regularly (or irregularly) acquires information denoting the access rate of each volume, and records the acquired information in the access rate table 801. This module 302 either references or creates the tables 901 and 1001 in addition to this table 801. This module 302 may also be a different program that does not belong to the migration control program 301.

The migration group management module 303 manages information related to the migration group. This module 303 references the table 311.

The migration schedule management module 304 manages information related to the management schedule. This module 304 either references or creates the tables 801, 901, 1001, 311, 701, 1101, 1801, and 2301. This module 304 uses table 1801 and/or table 2301 to determine the timing of the migration start.

The host information setting program 351 creates the host table 901. The information recorded in this table 901, for example, may be inputted from the user of the management server 105, and may be collected from the host 103.

The migration group setting program 312 creates the migration group table 311. Information related to the migration group is recorded in this table 311. The migration group may be defined by the user of the management server 105, and may be automatically defined by this program 312 via one method or another. For example, the program 312 may automatically define a plurality of migration groups based on the type of service being executed by the host computer and the PVOL that this host computer is using.

The migration schedule setting program 313 creates the migration schedule table 701. The schedule recorded in this table 701 may be defined by the management server 105 user, or may be defined by the migration setting program 301.

FIG. 3 shows the access rate table 801.

The access rate table 801 has information denoting the access rate for each PVOL at respective time periods. In the example shown in the drawing, the access rate for each one hour period is recorded, such as from 8:00 to 9:00 (however, does not include exactly 9:00), 9:00 to 10:00, and so forth. The "access rate" is expressed in terms of the access frequency and the total data transfer amount in this embodiment. "Access frequency" is the number of times that an access command is either issued or received. "Total data transfer amount" is the total amount of data inputted/outputted to/from the PVOL.

This table 801 is created and updated in accordance with the access check module 302. The module 302, for example, references the migration group table 311 (refer to FIG. 6A), specifies the ID of each migration group and the ID of each PVOL belonging to each migration group, and records the migration group IDs and PVOL IDs in the table 801. The module 302 also regularly (for example, every hour) acquires the access frequency and total data transfer amount of each PVOL, and records the acquired access frequency and total data transfer amount for each PVOL in the table 801. The access frequency and total data transfer amount are acquired from the host computer 103 and/or the storage device 104. For example, the host computer 103 maintains a log of the access command issue times and amount of inputted/outputted data for each volume (PVOL) allocated to itself. In accordance with this, the module 302 regularly acquires this log from the host computer 103, discerns from the acquired log the access frequency and the total data transfer amount of the PVOL for a certain period of time, and records the discerned access frequency and total data transfer amount in the table 801. For example, the storage device 104 also maintains a log of access command receipt times and inputted/outputted data amount for each PVOL. In accordance with this, the module 302 regularly acquires this log from the storage device 104, discerns from the acquired log the access frequency and the total data transfer amount of the PVOL for a certain period of time, and records the discerned access frequency and total data transfer amount in the table 801.

Figure 4:
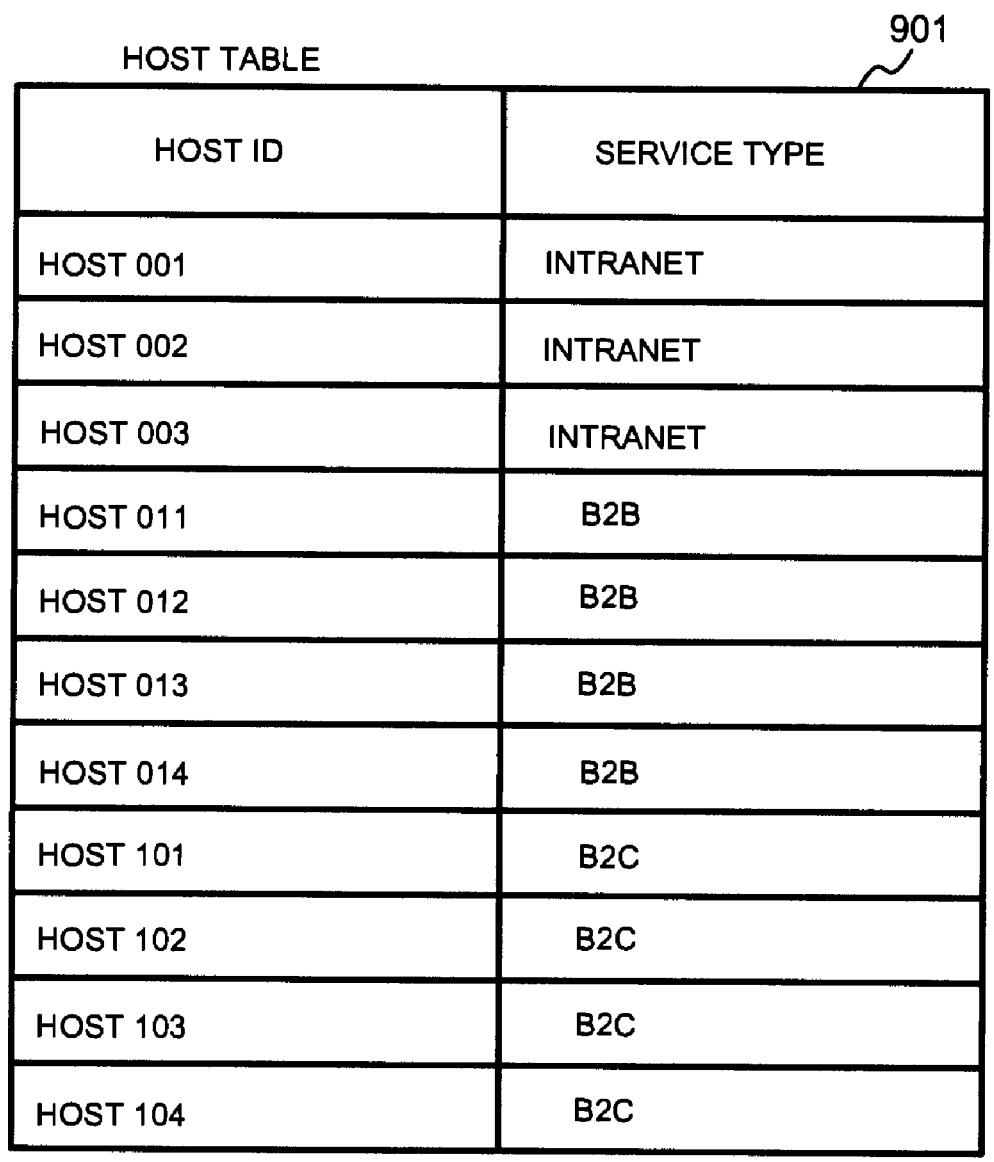
FIG. 4 shows a host table 901.

FIG. 4 shows the host table 901.

The host table 901 denotes which host computer is carrying out what type of service. Specifically, for example, a host computer ID and a name denoting the type of service are recorded in this table 901 for each host computer. The type of service, for example, may include an intranet-based service, a B2B (Business to Business)-oriented service and a B2C (Business to Consumer)-oriented service.

FIG. 5 shows a group mapping table 1001.

This table 1001 denotes the corresponding relationship between a host computer 103 and a migration group. Specifically, for example, this table 1001 records a host computer 103 ID and the ID of a migration group corresponding to this host computer 103 for each host computer 103. The migration group comprising the PVOL that has been allocated to the host computer 103 corresponds to this host computer 103. Furthermore, information denoting which PVOL has been allocated to which host computer 103, for example, is managed by the storage device 104, and it is possible to discern which PVOL has been allocated to which host computer 103 by the management server 105 (for example, the migration group management module 303) acquiring this information. Then, the module 303 is able to discern which PVOL is included in which migration group by referencing the migration group table 601 (Refer to FIG. 6A). As a result, the module 303 is able to discern which migration group corresponds to which host computer 103, thereby making it possible to create this table 1001.

Furthermore, according to the table 901 shown in FIG. 4 and the table 1001 shown in FIG. 5, the migration group is prepared by type of service. That is, the migration group A corresponds to an intranet, the migration group B corresponds to B2B, and the migration group C corresponds to B2C.

FIG. 6A shows the migration group table 601.

This table 601 denotes which PVOL and SVOL belong to which migration group. Specifically, for example, this table 601 records the migration group ID, the ID of the PVOL that belongs to this group, and the ID of the SVOL that belongs to this group for each migration group.

FIG. 6B shows the migration schedule table 701.

This table 701 denotes the migration start time for each migration group. Specifically, for example, this table 701 records the migration group ID and the migration start time for this migration group for each migration group.

The point table 1101 denotes a statistic related to the occurrence frequency occurrence of a deviation time, which is the difference between the scheduled service time (for example, the scheduled start time and/or the scheduled end time) and the service execution time (for example, the actual start time and/or end time). This statistic is recorded for each type of service. For example, the migration schedule management module 304 receives from each host computer 103 information (for example, a log) describing the scheduled service time and the service execution time, and based on this information, either creates or updates this table 1101. The point table 1101 is used to create the estimated access rate table 1801.

As the point table 1101, there may be a first point table denoting the statistics on the deviation frequency per day, and a second point table denoting the statistics on the deviation frequency for a plurality of days. The plurality of days is a desired number of days, such as one week or one month. In this embodiment, a table denoting the deviation frequency for one week is prepared as the second point table.

FIG. 7 shows the first point table 1101D.

The frequency of occurrence of deviation time by length of time is recorded in this table 1101D for each type of service. The deviation time is classified as any length of time that involves this deviation time. For example, in a case where the deviation time is not greater than 30 minutes, this deviation time is classifies as the length of time "0 hour", and in a case where the deviation time is more than 30 minutes but less than 1.5 hours, this deviation time is classified as the length of time "1 hour".

The frequency of occurrence value recorded in the table 1101D is a normalized value having a fixed length of time (for example, 12 hours) as 100%. According to the example of FIG. 7, the probability of deviation not occurring for the service type "B2C" is 40%, the probability of a one-hour deviation occurring is 30%, and the probability of a two-hour deviation occurring is 15%. The total of all the values (deviation frequency values) described in a single row is 100%.

FIG. 8 shows the second point table 1101W.

A daily coefficient (abbreviated as "DC" in the drawing) of each frequency of occurrence is described in this table 1101W for each type of service in addition to the information recorded in the table 1101D. The "daily coefficient" is the influence (weight) of the target day within one week, and to be precise, the correlation of the deviation between the service execution time and the scheduled service time. Specifically, for example, in the case of the service type "B2C", it is clear that the daily coefficient (weight) of the day before the present day is "0.80", and that the daily coefficient of the day two days before the present day is "0.10". The total of all the daily coefficients from one day ago to seven days ago in principle is "1.00". Furthermore, in a case where the type of service is "intranet" and "B2B", because the daily coefficient for each day from one day ago to seven days ago is the same, the total of all the daily coefficients is "0.98" and does not become "1.00". According to the example of FIG. 8, in the case of the service type "B2C", there is no correlation of deviation the further removed from the present it becomes, and in the case of the "B2B" and the "intranet", there is no change in the correlation over time.

The method for creating the point tables 1101D and 1101W will be explained later.

FIG. 9 shows an example of a GUI (Graphical User Interface) displayed by the migration schedule management module 304.

In this GUI, there is displayed a display table 1401 denoting the access rate at respective time periods for each PVOL that belongs to each migration group, and information denoting the migration start timing determined by the module 304.

When the determined migration start timing is good, the user presses the OK button 1402. In accordance with this, the module 304 issues a migration command in accordance with the determined migration start timing. As the method for doing this, for example, there is a method that issues the migration command at the determined migration start timing, and there is a method that issues a migration command comprising a time denoting this migration start timing and a volume migration commences when this time arrives.

When the determined migration start timing is not good, the user presses the NG button 1403. In accordance with this, the module 304 receives from the user the migration start time for each migration group and/or the migration start timing (either the order or the time) for each volume pair inside each migration group while displaying the display table 1401 as-is. The user is able to specify the migration start time of each migration group and/or the migration start timing of each volume pair belonging to the migration group while viewing the display table 1401. The module 304 determines the migration start time of each migration group and/or the migration start timing of each volume pair belonging to the migration group based on the start timing specified by the user.

Furthermore, the display table 1401 is a visualized table that makes the access rate table 801 easy to understand. In the display table 1401, the darkness of the cell for each time period for each PVOL denotes the magnitude of the access rate. Specifically, for example, the magnitude of the access rate has four levels, and the darkness of the cell also has four levels. The darkest cell corresponds to the highest level of the access rate. Since the time periods during which the host computer 103 is used most often will differ in accordance with the service, the high access rate time period and the low access rate time period will also differ in accordance with the service. According to the display table 1401, for example, it is clear that access to the PVOL belonging to the migration group A is concentrated between the period from 9:00 to less than 12:00 and for the period from 2:00 to less than 3:00, and that access to the PVOL belonging to the migration group B is concentrated between the period from 9:00 to less than 15:00 and the period from 24:00 to less than 2:00.

Furthermore, the access rate table 801 itself may be displayed instead of the display table 1401.

FIG. 10 shows a portion of the estimated access rate table 1801, and FIG. 11 shows the remainder of this table 1801. That is, FIGS. 10 and 11 show the table 1801.

This table 1801 is created by the module 304. The module 304 estimates the access rate for each time period for each PVOL, and records the estimated access rate in this table 1801. Furthermore, the estimated access rate referred to here is the estimated data transfer amount (the estimated amount of data transferred).

The order of the migration start timing for each PVOL begins from the lowest estimated data transfer amount. In other words, a volume migration is performed beginning with the PVOL with the lowest estimated access rate. In the example of FIGS. 10 and 11, when the migration start time of the migration group A is 8:00, the estimated data transfer amounts of the respective PVOL 1, 2, and 3 belonging to the migration group A become 6.83, 7.71 and 2.92, respectively, as shown in FIG. 12A. In accordance with this, the module 304 carries out the PVOL migrations in order from the PVOL with the lowest estimated data transfer amount, that is, in the order PVOL3, PVOL1 and PVOL2. Consequently, the very first migration is performed from PVOL3, and after this migration ends, a migration is performed from PVOL1, and after this migrations ends, a migration is performed from PVOL2, and when this migration ends, the migration for the migration group A ends. Furthermore, in a case where it is possible to perform volume migrations for two volume pairs in parallel, the migration from PVOL3 and the migration from PVOL1 are performed in parallel, and the migration of PVOL2 may commence when either one of these migrations ends.

Furthermore, the module 304 is able to create an estimated access rate table 1801G by migration group as shown in FIG. 12B based on the table 1801 and the migration group table 601 (refer to FIG. 6A). In this table 1801G, the respective values in the row corresponding to each migration group are computed based on the estimated data transfer amount for the plurality of PVOL belonging to this migration group for each time period. Specifically, for example, the estimated data transfer amount "5.82" for the time period between 8:00 and less than 9:00 in the row corresponding to the migration group A is the average of the estimated data transfer amounts "6.83", "7.71", and "2.92" for the PVOL 1, 2 and 3 for the time period between 8:00 and less than 9:00.

The module 304 is able to determine the migration start time of each migration group based on the table 1801G. Specifically, for example, the module 304 determines the time (for example, the start time) belonging to the time period during which the estimated data transfer amount is the lowest for each migration group as the migration start time of this migration group. According to the example of FIG. 12B, for the migration group A, the start time "19:00" of the time period "between 19:00 and less than 20:00" corresponding to "0.03", which is the lowest estimated amount of the estimated data transfer amounts corresponding to the migration group A, is determined to be the migration start time. This determined time, for example, is displayed in the GUI shown in FIG. 9, and when accepted by the user (when the OK button 1402 is pressed), is formally determined as the migration start time. The module 304 records the determined time in the migration schedule table 701.

Now then, this embodiment comprises the following four timing determination processes:
- (A) process for determining the start timing of the migrations from each PVOL belonging to a single migration group without using the point table;
- (B) process for determining the migration start timing for each migration group without using the point table;
- (C) process for determining the start timing of the migrations from each PVOL belonging to a single migration group using the point table; and
- (D) process for determining the migration start timing for each migration group using the point table.

Of the above four timing determination processes, the migration control program 301 is able to carry out either (A) and (B), (C) and (D), (A) and (D), or (B) and (C). In other words, just because the point table was used for one of the determinations, i.e. the determination of the start timing of the migration from each PVOL or the determination of the migration start timing of each migration group, does not mean that the point table has to be used for the other.

The respective processing of the above-mentioned (A) through (D) will be explained below.

<(A) Process for Determining the Start Timing of the Migrations from Each PVOL Belonging to a Single Migration Group without Using the Point Table>

The migration control program 301 uses the access rate table 801 to determine the start timing of the migration from each PVOL belonging to a single migration group. The access rate table 801 is updated as follows.

FIG. 13 shows the flow of processing for an access check carried out by the access check module 302.

The module 302 regularly repeats S1511 and S1512 (Loop (A)).

That is, in S1511, the module 302 acquires information related to the access rate from each storage device 104, and from this information discerns the access frequency and total data transfer amount for each time period. This information may be the access frequency and total data transfer amount for each time period, and may also be a log of the time at which the access command was received (and/or the time denoted by the time stamp included in the access command) and the amount of data (data transfer amount) inputted/outputted in responses to this access command. Further, this information may be acquired from each host computer 103 either instead of or in addition to being acquired from each storage device 104. Information acquired from each host computer 103, for example, comprises the time at which the access command was issued and the data transfer amount.

In S1512, the module 302 records the discerned access frequency and total data transfer amount in the access rate table 801.

The access rate table 801 is regularly updated in accordance with the above access check process.

FIG. 14 shows the flow of processing for a first timing determination. This process is for determining the start timing of the migration from each PVOL belonging to the target migration group without using the point table.

In S1401, the module 304 references the migration group table 601, and discerns the plurality of PVOL belonging to the target migration group.

In S1402, the migration schedule management module 304 references the migration schedule table 311, and determines whether or not the migration start time is described for the target migration group. In a case where this start time is described, S1403 is carried out, and in a case where this time is not described, S1411 is carried out.

In S1403, the module 304 references the access rate table 801, and estimates the access rate of each PVOL discerned in S1401 at the future time period to which the migration start time discerned in S1402 belongs. Specifically, the module 304 discerns the access rate of each PVOL discerned in S1401 at the past time period to which the migration start time discerned in S1402 belongs. For example, in a case where the migration start time is 8:00, the relevant past time period is the period between 8:00 and less than 9:00. Furthermore, the past time period is the time period in a predetermined period of the past (a period from the present until a predetermined period in the past). For example, in a case where the predetermined period of the past is n days in the past (where n is a natural number), the access rates of n relevant time periods (for example, the periods between 8:00 and 9:00) for the past n days is discerned. When n is an integer of 2 or more, the value computed on the basis of n access rates (for example, the maximum value, the minimum value and the average of n access rates) becomes the estimated access rate.

In S1404, the module 304 determines that the migration for the plurality of PVOL discerned in S1401 will start from the PVOL for which the access rate estimated (discerned) in S1403 is low. For example, in a case where the PVOL with the lowest access rate of the PVOL 1, 2 and 3 is PVOL3, the PVOL with the next lowest access rate is PVOL1, and the PVOL with the highest access rate is PVOL2, the module 304 determines that the migrations will start in ascending order from PVOL3, PVOL1 and PVOL2.

In accordance with S1402, S1403 and S1404 above, the module 304 determines the migration start order of each PVOL belonging to this migration group when the migration start time for the target migration group has already been defined.

Thereafter, the module 304 sends the migration command specifying the PVOL and the SVOL to the storage device 104 that has either the PVOL or the SVOL belonging to the target migration group in accordance with the start timing determined in S1404. For example, when the migration start time for the target migration group has been reached, the module 304 first sends the migration command specifying the PVOL3 and the SVOL that forms a pair therewith to the storage device 104 including either the PVOL3 or the SVOL that forms a pair therewith. Upon receiving a migration-complete report from this storage device 104, the module 304 sends the migration command specifying the PVOL1 and the SVOL that forms a pair therewith to the storage device 104 including either this PVOL1 or the SVOL that forms a pair therewith.

In S1411, the module 304 estimates the access rate for a predetermined period in the future (a period from the present until a predetermined period in the future) of each PVOL discerned in S1401. Specifically, the module 304 discerns the access rate for a predetermined period in the past (a period from the present until a predetermined period in the past) of each PVOL discerned in S1401. For example, in a case where the predetermined period in the future is m days (where m is a natural number), and the predetermined period in the past is n days ago (where n is a natural number), the access rate (estimated access rate) for the predetermined period in the future is computed based on n/m access rates. Specifically, for example, in a case where m=1 and n=1, the access rate for each time period for one day in the future is the same as the access rate for each time period during the one day in the past. Further, for example, when m=1 and n=7, the access rate for each time period for one day in the future is computed based on seven (7/1) access rates for each time period during the past seven days (for example, the maximum value, the minimum value or the average).

In S1412, the module 304 determines the migration start time of each PVOL based on the estimated access rate of each PVOL discerned in S1401. The determined migration start time of the PVOL is the time (for example, the start time) belonging to the time period with the lowest estimated access rate for this PVOL.

In accordance with S1402, S1411, and S1412 above, in a case where the migration start time for the target migration group has not been defined, the module 304 determines the migration start time of each PVOL belonging to this migration group.

The module 304 is able to display the access rate estimated in either S1403 or S1411 and/or the migration start timing determined in either S1404 or S1412 on the output device 207.

<(B) Process for Determining the Migration Start Timing for Each Migration Group without Using the Point Table>

Figure 15:
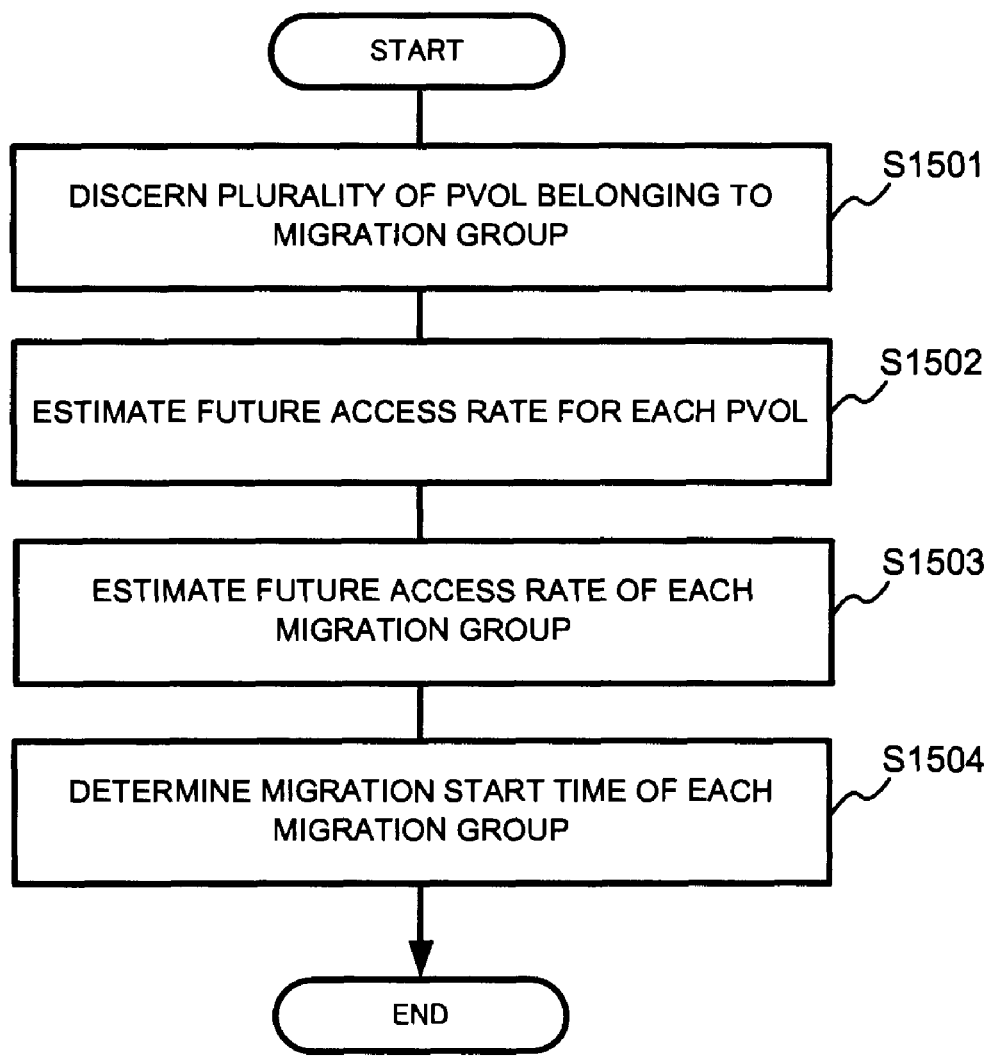
FIG. 15 shows the flow of processing for a second timing determination.

FIG. 15 shows the flow of processing of a second timing determination. This process is for determining the migration start timing for each migration group.

In S1501, the module 304 references the migration group table 601, and discerns the plurality of PVOL belonging to the migration group for each migration group.

In S1502, the module 304, using the same method as that of S1411 of FIG. 14, estimates the access rate for each time period in a predetermined period in the future for each PVOL discerned in S1501.

In S1503, the module 304 computes the estimated access rate of the migration group based on the plurality of estimated access rates corresponding to the plurality of PVOL belonging to the migration group for each migration group. The estimated access rate of the migration group, for example, is the average, total, maximum value or minimum value of the plurality of estimated access rates corresponding to the plurality of PVOL belonging to this group.

In S1504, the module 304 determines the migration start time of each migration group based on the estimated access rate for each migration group computed in S1503. For example, the module 304 determines the time (for example, the start time) within the time period having the lowest estimated access rate as the migration start time for each migration group. Specifically, for example, according to the table 1801G shown in FIG. 12B, these migration start times are as follows:

(1) The migration start time of the migration group A is the start time "19:00" of the time period "between 19:00 and less than 20:00" corresponding to the lowest estimated amount "0.03" of the estimated data transfer amount (estimated access rate) corresponding to the migration group A;

(2) The migration start time of the migration group B is the start time "20:00" of the time period "between 20:00 and less than 21:00" corresponding to the lowest estimated amount "0.83" of the estimated data transfer amount (estimated access rate) corresponding to the migration group B; and (3) The migration start time of the migration group C is the start time "10:00" of the time period "between 10:00 and less than 11:00" corresponding to the lowest estimated amount "0.09" of the estimated data transfer amount (estimated access rate) corresponding to the migration group C.

The module 304 records the migration start time determined for each migration group in the migration schedule table 701. The module 304 may record this migration start time in the table 701 in a case where the determined migration start time has been displayed and the approval of the user obtained.

<(C) Process for Determining the Start Timing of the Migrations from Each PVOL Belonging to a Single Migration Group Using the Point Table>

In general, the occurrence of a deviation between the scheduled service time and the service execution time, and the size of the deviation that occurs will differ in accordance with the type of service. For example, in a case where the type of service is B2C (for example, television shopping, ticket sales or internet marketing), there are instances when the service start time is moved up and instances when the service end time is delayed. Further, for example, in a case where the type of service is an intranet (for example, in-house services, such as management tasks, man-hour management and personnel management), service start times and end times are most often implemented on schedule, and cases where the service start time is moved up or the service end time is delayed very seldom occur. Further, when the type of service is B2B (for example, the settlement of industry transactions and store accounts, and ordering services), the likelihood of the service start times and end times being implemented on schedule is lower than that of the intranet but higher than that of the B2C.

The above-mentioned point table 1101 is created based on this perspective.

Figure 16:
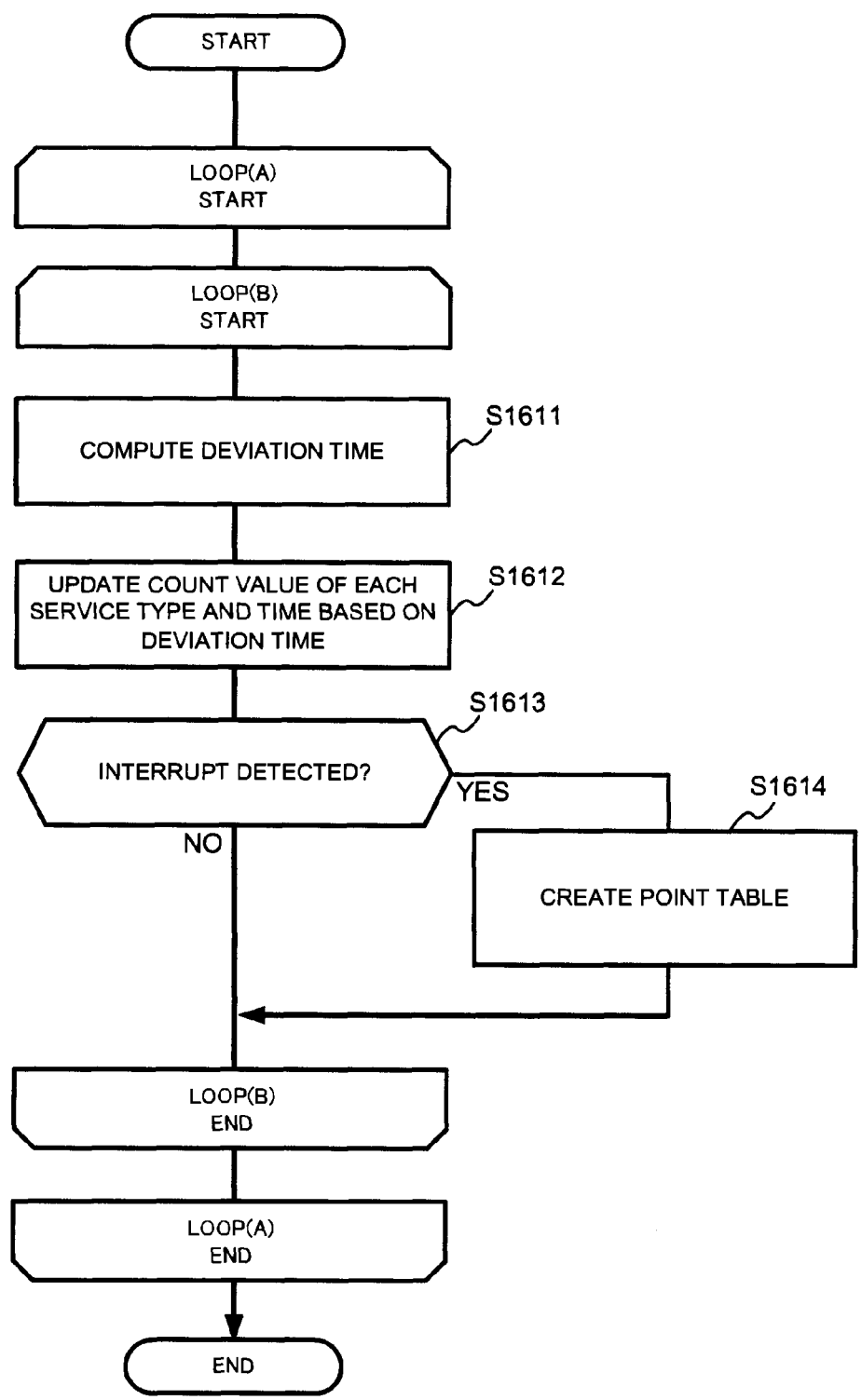
FIG. 16 shows the flow of processing for creating a point table 1101.

FIG. 16 shows the flow of processing for creating the point table 1101.

For example, this processing is carried out regularly (Loop (A)). Further, S1611 through S1614 are performed for each host computer 103 (Loop (B)).

In S1611, the module 304 acquires from the host computer 103 information comprising the service execution time (the start time and/or end time of the service) and the scheduled service time (the scheduled start time and/or the scheduled end time), and based on this information, computes the deviation time, which is the difference between the service execution time and the scheduled service time.

In S1612, the module 304 updates the count value for each service type and time period based on the deviation time computed in S1611. Specifically, for example, in a case where the deviation time computed in S1611 is one hour and the host computer 103 service type corresponding to this deviation time is "B2C", the count values corresponding to the service type "B2C" and the length of time "one hour" are updated.

An interrupt occurs at a fixed time interval. Upon detecting the interrupt (S1613: YES), the module 304 creates the point table 1101 (S1614). That is, the module 304 computes the frequency of occurrence of deviations corresponding to each service type and each length of time based on the length of this fixed time and on the respective count values corresponding to each service type and each length of time, and creates the point table 1101 in which a normalized value is recorded for each deviation frequency of occurrence.

As the point table 1101, there are the first point table 1101D shown in FIG. 7 and the second point table 1101W shown in FIG. 8 as mentioned above. The second point table 1101W provides a daily coefficient for each day for the one week prior to the present day. The module 304, for example, uses the following procedure to arrive at the daily coefficient:

(1) Places the amounts of data of the same times one day ago and (1+p) days ago into a two-dimensional coordinate set of x, y (xi, yi) (where p is an integer from 1 through 6, but at this point in time p=1) (i expresses the same time);

(2) Regards the assumed estimation formula as F(x)=y=x, and computes the coefficient of determination from the distribution of errors in accordance with formula (X) below:

$$\text{Determination coefficient}(R^2)=1-\{(\Sigma_i(y_i-(\text{estimate of } y))^2/(\Sigma_i(y_i-(\text{average of } y))^2)\} \quad (X)$$

(3) Executes the above (1) and (2) for p=p+1 (repeating this (3) until p=6); and (4) Computes the daily coefficient=(determination coefficient for each day/(sum total of determination coefficients obtained in (3))

Either the second point table 1101W comprising daily coefficients computed as described above or the first point table 1101D is used in the first timing determination process explained by referring to FIG. 14.

That is, in S1403 (or S1411), the module 304 creates the estimated access rate table 1801 based on either the point table 1101D or the point table 1101W and the access rate table 801. Specifically, for example, the module 304 computes the following (Y) formula:

$$\text{Estimated access rate}=\Sigma_i g_i x_i / \Sigma_i g_i \quad (Y)$$

The i is the interval for capturing the deviation frequency of occurrence, and the g is the frequency (probability) at the relevant i. Specifically, for example, in a case where the migration start time of the target migration group is 8:00, the module 304 computes the following (y) formula in accordance with the above (Y) formula:

PVOL1 estimated access rate={(((deviation frequency of occurrence for length of time "0")×(total data transfer amount per 1K (kilo) accesses of PVOL1 between 8:00 and less than 9:00)+((deviation frequency of occurrence for length of time "1")× (total data transfer amount per 1K accesses of PVOL1 between 9:00 and less than 10:00)+((deviation frequency of occurrence for length of time "2")×(total data transfer amount per 1K accesses of PVOL1 between 10:00 and less than 11:00)+...}÷24 hours  (y)

The estimated access rate of each PVOL of the target migration group is computed and the estimated access rate table 1801 in created in S1403 (or S1411) as described above. Then, based on this estimated access rate table 1801, the migration start timing (either order or time) for each PVOL of the target migration group is determined (S1404 or S1412).

<(D) Process for Determining the Migration Start Timing for Each Migration Group Using the Point Table>

In S1502 of FIG. 15, the estimated access rate of each PVOL is computed using the point table 1101 (either 1101D or 1101W) and the access rate table 801. Then, in S1503, the estimated access rate for each migration group is computed based on the result of S1502. The migration start time for each migration group is determined based on the result of S1503.

According to the embodiment described above, the future access rate for each PVOL belonging to the migration group is estimated, and based on the estimated access rate, the migration start order, i.e. the PVOL from which migration is to be performed, or the migration start time, i.e. when the migration is to be performed from which PVOL, is determined. Specifically, the migration is started from the PVOL with a low estimated access rate first, or the migration is started at a time within the time period with the lowest estimated access rate. A small estimated access rate refers to the fact that new data is infrequently written to the PVOL during the time period corresponding to this estimated access rate. For this reason, in a case where a volume migration is carried out during this time period, the amount of data that must be transferred in an additional migration will either be zero or small, thereby making it possible to prevent prolonging the time required for a volume migration of the entire migration group. Furthermore, "additional migration" as used here refers to the migration of the data from the PVOL to the SVOL in a case where new data is written to a migration-completed area (a storage area in which already migrated data is being stored) inside the PVOL.

Further, according to the embodiment described above, the future access rate for each migration group is estimated, and based on the estimated access rate, the migration start time is determined for each migration group. Specifically, a time within the time period with the lowest estimated access rate is determined to be the migration start time. In the time period with the lowest estimated access rate, new data is less frequently written to any PVOL belonging to the migration group than in another time period. For this reason, in a case where a volume migration is carried out during this time period, the amount of data that must be transferred in an additional migration will either be zero or small, thereby making it possible to prevent prolonging the time required for a volume migration of the entire migration group.

Further, according to the embodiment described above, the estimated access rate is computed based on the statistics of the frequency with which a deviation occurs between the schedule service time and the service execution time, and the deviation time. For this reason, the estimated access rate can be counted on to be a more appropriate value, thereby increasing the likelihood that the time required for the volume migration of the entire migration group will be able to be shortened.

One embodiment of the present invention has been explained above, but the present invention is not limited to this embodiment, and various variations and modifications may be possible without departing from the scope of the present invention. For example, in a case where the estimated access rate is the same for a plurality of PVOL, the estimated access rate for the plurality of SVOL corresponding to these plurality of PVOL may be taken into account (for example, the total amount of data read out and/or the readout frequency). For example, a copy may be carried out to the SVOL in ascending order from the one having the lowest estimated access rate. Since the access to the SVOL is relaxed, the prolongation of the time required for the volume migration of the entire migration group may be prevented.

What is claimed is:

1. A computer system coupled to one or more storage devices including a plurality of logical volumes belonging to a volume group, the computer system comprising:
 a storage resource; and
 a processor coupled to the storage resource, wherein:
the volume group is a group of two or more copy-source volumes and two or more copy-destination volumes respectively forming pairs with the two or more copy-source volumes,
the storage resource stores access rate information, which is information denoting the access rate of each copy-source volume for respective time periods,
the access rate for one copy-source volume is the rate of accesses to the copy-source volume from a host computer, and an access is at least a write of a write and a read,
the processor:
  (a) estimates the access rate for a future target period for each copy-source volume based on the access rate information;
  (b) determines a start timing of a copy for each copy-source volume based on the result of the estimation in the (a); and
  (c) sends, to the storage device including either the copy-source volume or the copy-destination volume, a copy command for carrying out a volume copy from the copy-source volume to the copy-destination volume, according to the determined copy start timing,
wherein:
  the target period is configured from either one or a plurality of time periods,
  the processor, in the (a), estimates the access rate for the future target period for each copy-source volume based on information denoting the access rate of each copy-source volume for one or more past target periods in a predetermined period from among the access rate information, and a start time and an end time of the past target period are the same as the start time and the end time of the future target period,
wherein:
  the storage resource stores host information denoting which host computer carries out what type of service,
  a plurality of volume groups are provided, and
  each volume group includes a plurality of copy-source volumes and copy-destination volumes,
  each copy-source volume is allocated to a host computer,
  the plurality of copy-source volumes belonging to a same volume group are allocated to one or more host computers that carry out the same type of service,
  the processor detects the access rate for each copy-source volume for each consecutive time period, and reflects in the access rate information the result of the detection,
  the processor:
    (d) computes a deviation occurrence frequency corresponding to respective lengths of time by the type of service based on a scheduled service start time, a service start time for each host computer, and the host information;
    (e) in addition to the access rate information, estimates, for each copy-source volume in the (a), the access rate for each consecutive time period in the future target period based on the deviation occurrence frequency for each length of time for the type of service corresponding to the volume a group to which each copy-source volume belongs;
    (f) computes an estimated access rate for each consecutive time period in the future target period for each volume group based on the estimated access rate for each copy-source volume computed in the (e), and based on which copy-source volume belongs to which volume group;
    (g) determines the start time of the time period with the lowest estimated access rate obtained by computation as the copy start time for each volume group; and
    (h) in the (b), determines that the copy starts for each volume group in ascending order from the lowest to higher estimated access rate from the time period of the copy start time determined in the (g), the deviation occurrence frequency is the occurrence frequency of a deviation time, which is the difference between the scheduled service start time and a service execution time.

2. The computer system according to claim 1, wherein the processor:
in the (d), computes the influence of each unit period in a period from the present until a predetermined time for each service type; and
in the (e), estimates the access rate for each consecutive time period in the future target period based on the influence of each unit period.

3. The computer system according to claim 1, wherein the estimated access rate of the future target period is based on a scheduled service time and a past log of the service execution time of each host computer.

4. The computer system according to claim 1, wherein the processor, in the (b), determines that the copy starts for the volume group in ascending order from the lowest to higher estimated access rate from the copy-start-time time period.

5. The computer system according to claim 1, wherein the processor, in the (b), determines a time belonging to the time period with the lowest estimated access rate as the copy start time for each copy-source volume.

6. The computer system according to claim 1, wherein the processor displays information denoting the result of the estimate in the (a) and/or information denoting the result of the determination in the (b).

7. The computer system according to claim 1, wherein:
a plurality of volume groups are provided,
each volume group includes a plurality of copy-source volumes and copy-destination volumes,
the processor:
  computes the estimated access rate for each time period in the future target period for each volume group based on the estimated access rate of each copy-source volume, and based on which copy-source volume belongs to which volume group, and
  determines the start time of the time period with the lowest estimated access rate obtained by computation as the copy start time for each volume group.

8. The computer system according to claim 7, wherein the processor, in the (b), determines that the copy starts for each volume group in ascending order from the lowest to higher estimated access rate from the determined copy-start-time time period.

9. The computer system according to claim 7, wherein the processor displays information denoting the estimated access rate for each volume group and/or information denoting the determined copy start time for each volume group.

10. A computer system coupled to one or more storage devices including a plurality of logical volumes belonging to a volume group, the computer system comprising:
a storage resource; and
a processor coupled to the storage resource,
wherein:

the volume group is a group of two or more copy-source volumes and two or more copy-destination volumes respectively forming pairs with the two or more copy-source volumes, the storage resource stores access rate information, which is information denoting the access rate of each copy-source volume for respective time periods, the access rate for one copy-source volume is the rate of accesses to the copy-source volume from a host computer, and an access is at least a write of a write and a read, the processor:
- (a) estimates the access rate for a future target period for each copy-source volume based on the access rate information;
- (b) determines a start timing of a copy for each copy-source volume based on the result of the estimation in the (a); and
- (c) sends, to the storage device including either the copy-source volume or the co-destination volume a copy command for carrying out a volume copy from the copy-source volume to the copy-destination volume, according to the determined copy start timing, wherein:
the target period is configured from either one or a plurality of time periods, the processor, in the (a), estimates the access rate for the future target period for each copy-source volume based on information denoting the access rate of each copy-source volume for one or more past target periods in a predetermined period from among the access rate information, and a start time and an end time of the past target period are the same as the start time and the end time of the future target period, wherein the estimated access rate of the future target period is based on a scheduled service time and a past log of a service execution time of each host computer, wherein the processor:
computes a deviation occurrence frequency corresponding to various lengths of time based on the scheduled service time and the service execution time of each host computer, in the (a), in addition to the access rate information, estimates for each copy-source volume the access rate for the future target period based on the deviation occurrence frequency corresponding to the various lengths of time, and the deviation occurrence frequency is the occurrence frequency of a deviation time, which is a difference between the scheduled service time and the service execution time.

11. The computer system according to claim 10, wherein:
the type of service performed by a host computer performs is predetermined for each host computer, and
the deviation occurrence frequency corresponding to the various lengths of time is computed for the type of service.

12. The computer system according to claim 11, wherein:
the processor computes the influence of each unit period in a period from the present until a predetermined time for each service type, and
in the (a), estimates the access rate for each consecutive time period in the future target period based on the influence of each unit period.

13. A method for controlling a copy between volumes belonging to a volume group, which is a group of two or more copy-source volumes and two or more copy-destination volumes respectively forming pairs with these two or more copy-source volumes, the method comprising the steps of
- (a) estimating the access rate of a future target period for each copy-source volume based on access rate information, which is information denoting an access rate for each copy-source volume at respective time periods;
- (b) determining the start timing of a copy for each copy-source volume based on the result of the estimation in the (a); and
- (c) sending, to a storage device including either the copy-source volume or the copy-destination volume, a copy command for carrying out a volume copy from the copy-source volume to the copy-destination volume, according to the determined copy start timing, wherein:
the access rate for a single copy-source volume is a rate of accesses to the copy-source volume from a host computer, an access is at least a write of a write and a read, the target period is configured from either one or a plurality of time periods in the (a), the access rate for the future target period for each copy-source volume is estimated based on information denoting the access rate of each copy-source volume for one or more past target periods in a predetermined period from among the access rate information, and a start time and an end time of the past target period are the same as the start time and the end time of the future target period wherein the estimated access rate of the future target period is based on a scheduled service time and a past log of a service execution time of each host computer, the method further comprising:
computing a deviation occurrence frequency corresponding to various lengths of time based on the scheduled service time and the service execution time of each host computer; and in the (a), in addition to the access rate information, estimating for each copy-source volume the access rate for the future target period based on the deviation occurrence frequency corresponding to the various lengths of time, wherein the deviation occurrence frequency is the occurrence frequency of a deviation time, which is a difference between the scheduled service time and the service execution time.

14. A non-transitory computer-readable medium having instructions stored thereon for execution by a computer system coupled to one or more storage devices, the instructions comprising:
- (a) estimating the access rate of a future target period for each copy-source volume based on access rate information, which is information denoting an access rate for each copy-source volume at respective time periods;
- (b) determining the start timing of a copy for each copy-source volume based on the result of the estimation in the (a); and
- (c) sending, to a storage device including either the copy-source volume or the copy-destination volume, a copy command for carrying out a volume copy from the copy-source volume to the copy-destination volume, according to the determined copy start timing, wherein:
the one or more storage devices include a volume group;

the volume group is a group of two or more copy-source volumes and two or more copy-destination volumes respectively forming pairs with these two or more copy-source volumes;

the target period is configured from either one or a plurality of time periods;

the access rate for a single copy-source volume is a rate of accesses to this copy-source volume from a host computer; an access is at least a write of a write and a read;

in the (a), the access rate for a future target period for each copy-source volume is estimated based on information denoting the access rate of each copy-source volume for one or more past target periods in a predetermined period from among the access rate information; and a start time and an end time of the past target period are the same as the start time and the end time of the future target period;

wherein the estimated access rate of the future target period is based on a scheduled service time and a past log of a service execution time of each host computer, the instructions further comprising:

computing a deviation occurrence frequency corresponding to various lengths of time based on the scheduled service time and the service execution time of each host computer; and in the (a), in addition to the access rate information, estimating for each copy-source volume the access rate for the future target period based on the deviation occurrence frequency corresponding to the various lengths of time, wherein the deviation occurrence frequency is the occurrence frequency of a deviation time, which is a difference between the scheduled service time and the service execution time.

* * * * *